United States Patent
Hamada

(10) Patent No.: US 8,875,759 B2
(45) Date of Patent: Nov. 4, 2014

(54) HEAVY DUTY TIRE

(75) Inventor: Takeshi Hamada, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 871 days.

(21) Appl. No.: 12/953,131

(22) Filed: Nov. 23, 2010

(65) Prior Publication Data

US 2011/0192513 A1  Aug. 11, 2011

(30) Foreign Application Priority Data

Feb. 5, 2010 (JP) ................................. 2010-024644

(51) Int. Cl.
- *B60C 11/04* (2006.01)
- *B60C 11/12* (2006.01)
- *B60C 11/13* (2006.01)
- *B60C 9/28* (2006.01)
- *B60C 3/04* (2006.01)
- *B60C 11/03* (2006.01)

(52) U.S. Cl.
CPC ........... *B60C 11/0306* (2013.04); *B60C 11/125* (2013.01); *B60C 9/28* (2013.01); *B60C 3/04* (2013.01); *B60C 2011/0381* (2013.04); *B60C 2200/06* (2013.04); *B60C 2011/0367* (2013.04); *B60C 11/047* (2013.04); *Y10S 152/03* (2013.01)
USPC ............. 152/209.18; 152/209.21; 152/DIG. 3

(58) Field of Classification Search
USPC .......................... 152/209.18, 209.21, DIG. 3
See application file for complete search history.

(56) References Cited

U.S. PATENT DOCUMENTS

| 5,738,740 A * | 4/1998 | Cluzel ........................... 152/538 |
| 2007/0012389 A1* | 1/2007 | Ito ............................. 152/209.22 |
| 2010/0200138 A1* | 8/2010 | Shibano ................... 152/209.25 |

FOREIGN PATENT DOCUMENTS

| JP | 6-239105 A | 8/1994 |
| JP | 6-239109 A | 8/1994 |
| JP | EP-855292 A1 * | 7/1998 |
| JP | 2000-158916 A * | 6/2000 |
| JP | 2000-168317 A * | 6/2000 |

OTHER PUBLICATIONS machine translation for Japan 2000-168317 (no date).*
machine translation for Japan 2000-158916 (no date).*

* cited by examiner

*Primary Examiner* — Steven D Maki
(74) *Attorney, Agent, or Firm* — Birch, Stewart, Kolasch & Birch, LLP

(57) ABSTRACT

A heavy duty tire comprises a tread portion provided with four or five circumferential grooves so as to axially divide the tread portion into five or six rib portions. The five or six rib portions are a pair of shoulder rib portions each provided with shoulder lateral groove, and three or four crown rib portions each provided with crown lateral grooves. The crown lateral grooves extend across the entire width of the crown rib portion. The shoulder lateral grooves extend axially outwardly from an axially inner edge of the shoulder rib portion so as to terminate at an axial distance of from 78 to 88% of the axial width of the shoulder rib portion from the above-mentioned axially inner edge. The depth of the circumferential grooves is 15 to 20 mm. The depth of the crown lateral grooves is 9 to 30% of the depth of the circumferential grooves. The depth of the shoulder lateral grooves is 9 to 25% of the depth of the circumferential grooves. The tread width TW is in a range of 0.78 to 0.87 times the cross sectional width SW of the tire.

7 Claims, 6 Drawing Sheets

HEAVY DUTY TIRE

BACKGROUND OF THE INVENTION

The present invention relates to a pneumatic tire, more particularly to a configuration of tread grooves for a heavy duty tire capable of improving resistance to shoulder wear of the tread portion and wet performance in the early period of the tread wear lifetime.

Heavy duty tires such as mud and snow tires and all terrain tires for use on rough terrains are usually provided with block-type tread patterns constituted by independent blocks separated from each other by deep tread grooves. On the other hand, heavy duty tires such as truck-and-bus tires for use on well-paved roads are usually provided with rib-type tread patterns constituted by circumferentially continuous ribs because the ribs can withstand heavier tire loads than the blocks. Even so, the heavy duty tires with rib-type tread patterns are liable to suffer from so called shoulder wear resulting from their relatively round tread profiles and heavy tire loads. Especially, the shoulder wear is liable to occur on the steered front wheels because a larger frictional energy is applied to the tread shoulder portions due to front wheel alignments, steering movements of the front wheels, relatively light tire load when compared with rear tires and the like.

SUMMARY OF THE INVENTION

It is therefore, an object of the present invention to provide a heavy duty tire suitable for use on well-paved roads in which, based on a five/six-rib tread pattern, by providing shallow lateral grooves, axially outermost shoulder rib portions are increased in the rigidity relatively to axially inner crown rib portions, and as a result, the resistance to shoulder wear is improved, and further wet performance in the early period of the tread wear lifetime is also improved.

According to the present invention, a heavy duty tire comprises a tread portion having tread edges defining a tread width TW, a pair of sidewall portions defining a cross sectional width SW of the tire, a pair of bead portions each with a bead core therein, a carcass extending between the bead portions through the tread portion and the sidewall portions, and a belt composed of a plurality of belt plies disposed radially outside the carcass in the tread portion, wherein the tread width TW is in a range of 0.78 to 0.87 times the cross sectional width SW of the tire, the tread portion is provided with four or five circumferential grooves each of which has a depth of from 15 to 20 mm and extends continuously in the tire circumferential direction so as to axially divide the tread portion into five or six rib portions, wherein the five or six rib portions are a pair of shoulder rib portions extending along the tread edges and provided with shoulder lateral groove, and three or four crown rib portions disposed between the shoulder rib portions and provided with crown lateral grooves, the depth of the crown lateral grooves is in a range of from 9 to 30% of the depth of the circumferential grooves, the depth of the shoulder lateral grooves is in a range of from 9 to 25% of the depth of the circumferential grooves, said crown lateral grooves are arranged at intervals in the tire circumferential direction and extend across the entire width of the crown rib portion, and said shoulder lateral grooves are arranged at intervals in the tire circumferential direction and extend axially outwardly from an axially inner edge of the shoulder rib portion so as to terminate at an axial distance of from 78 to 88% of the axial width of the shoulder rib portion from said axially inner edge.

Since the crown lateral grooves and shoulder lateral grooves are shallow, the shoulder rib portions and crown rib portions maintain substantial continuity in the tire circumferential direction, and as a results, retain the ability of a rib to withstand heavier tire loads than blocks. Further, the shoulder lateral grooves are terminated without reaching to the tread edges, therefore, the rigidity in the crown rib portions is decreased more than the shoulder rib portions suitably for improving the ground contact pressure distribution so that the frictional energy becomes evened between the shoulder rib portions and crown rib portions. Thus, the shoulder wear is improved without sacrificing the resistance to tread wear. Furthermore, wet performance such as wet grip can be improved by the edges of the lateral grooves as well as drainage by the lateral grooves.

Here, the tread width TW is the axial distance between the tread edges Te measured under a normally inflated unloaded condition of the tire.

The tread edges Te are the axial outermost edges of the ground contacting patch (camber angle=0) in a normally inflated loaded condition of the tire.

The normally inflated unloaded condition is such that the tire is mounted on a standard wheel rim and inflate to a standard pressure but loaded with no tire load.

The normally inflated loaded condition is such that the tire is mounted on the standard wheel rim and inflate to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load capacity" in ETRTO, the maximum value given in the above-mentioned table in TRA or the like.

In this application including specification and claims, various dimensions, positions and the like of the tire refer to those under the normally inflated unloaded condition of the tire unless otherwise noted.

The term "width" of a groove means a dimension measured perpendicularly to the widthwise center line of the groove unless otherwise stated.

DESCRIPTION OF THE PREFERRED EMBODIMENTS

Figure 1:
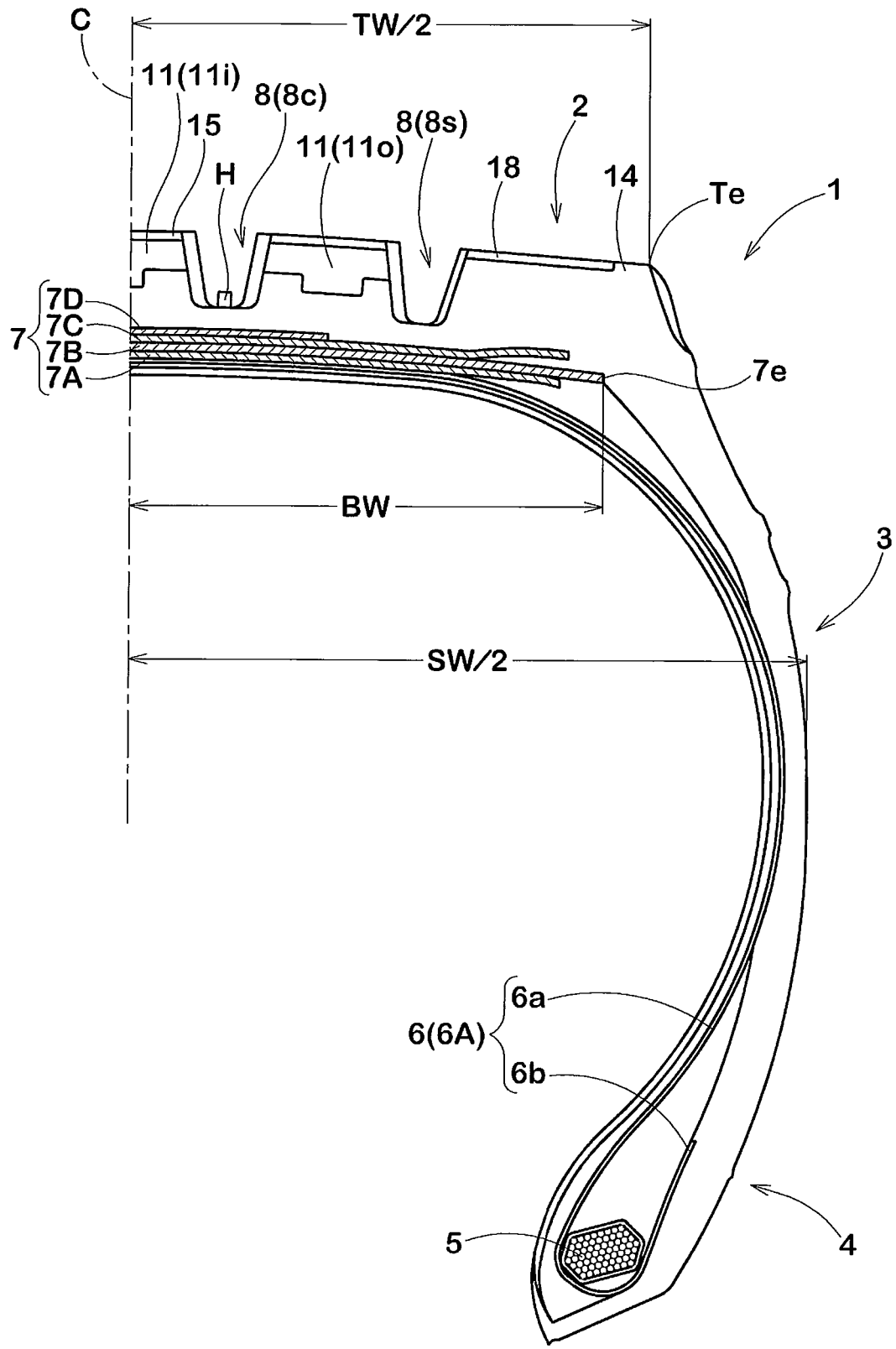
FIG. 1 is a cross sectional view of a heavy duty tire according to the present invention showing its normally inflated unloaded state.

Taking a truck/bus radial tire as an example, embodiments of the present invention will now be described in detail in conjunction with accompanying drawings.

According to the present invention, heavy duty tire 1 comprises a tread portion 2, a pair of sidewall portions 3, a pair of bead portions 4 each with a bead core 5 therein, a carcass 6 extending between the bead portions 4 through the tread portion 2 and sidewall portions 3, and a belt 7 disposed radially outside the carcass 6 in the tread portion 2 in order to reinforce the substantially entire width of the tread portion 2.

The carcass 6 is composed of at least one (in this example only one) carcass ply 6A of cords arranged radially at an angle of from 75 to 90 degrees with respect to the tire equator C, extending between the bead portions 4 through the tread portion 2 and sidewall portions 3, and turned up around the bead core 5 in each of the bead portions from the inside to the outside of the tire to form a pair of carcass ply turned up portions 6b and a carcass ply main portion 6a therebetween. In this example, steel cords are used as the carcass cords.

The belt 7 is composed of at least two cross plies 7A and 7B, in this example four plies 7A-7D including two cross plies 7A-7B. The belt plies are each made of rubberized high-elastic-modulus cords, e.g. steel cords or the like laid parallel with each other at an angle of 15 to 45 degrees with respect to the tire equator c.

The widest ply which defines the width of the belt 7 is, in this example, the second ply 7B next to the radially innermost first ply 7A.

According to the present invention, the tread portion 2 is provided with four or five circumferential grooves 8 extending continuously in the tire circumferential direction.

In the embodiment shown in the drawings, the tread portion 2 is provided with four circumferential grooves 8 which are: a pair of shoulder circumferential grooves 8s disposed one on each side of the tire equator C as a circumferential groove closest to the tread edge Te; and a pair of crown circumferential grooves 8c disposed one on each side of the tire equator c, and between the shoulder circumferential grooves 8s. The tread portion 2 is therefore, axially divided into five rib portions (annular regions) which are: two shoulder rib portions 14 each defined between one of the tread edges Te and one of the circumferential grooves 8 adjacent thereto; and three crown rib portions 11 between the two shoulder rib portions 14.

In the case of the tread portion 2 provided with five circumferential grooves 8, in addition to the above-mentioned shoulder circumferential grooves 8s and crown circumferential grooves 8c, the tread portion 2 is further provided with a crown circumferential groove 8c disposed on the tire equator c. Therefore, the tread portion 2 is axially divided into six rib portions which are the above-mentioned two shoulder rib portions 14 and four crown rib portions 11 therebetween.

In each case, the tread pattern is a bidirectional tread pattern, in other words, point symmetry about any point on the tire equator.

The above-mentioned three or four crown rib portions 11 include: a pair of axially outer crown rib portions 11o each defined between one of the shoulder circumferential grooves 8s and one the crown circumferential grooves 8c adjacent thereto; and one or two axially inner crown rib portions 11i between the adjacent crown circumferential grooves 8c.

Each of the crown rib portions 11 is provided with crown lateral grooves 15 arranged at intervals in the tire circumferential direction.

Each of the shoulder rib portions 14 is provided with shoulder lateral grooves 18 arranged at intervals in the tire circumferential direction.

The shoulder lateral grooves 18 are arranged at circumferential pitches P same as the circumferential pitches of the crown lateral grooves 15.

Figure 2:
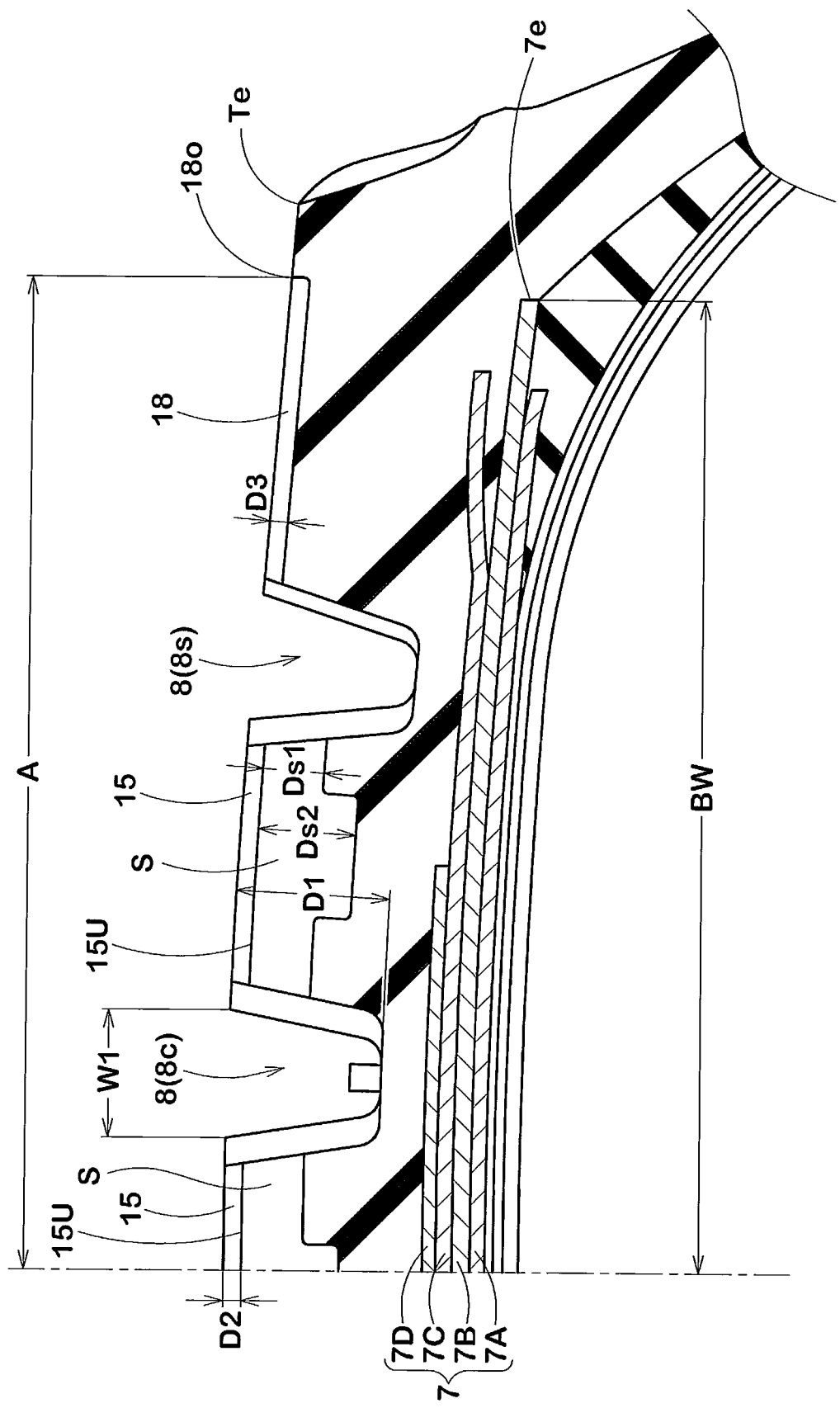
FIG. 2 is an enlarged cross sectional view the tread portion thereof.

As shown in FIG. 2, when compared with the circumferential grooves 8, the crown lateral grooves 15 and shoulder lateral grooves 18 are very shallow.

The crown lateral grooves 15 extend across the entire width of the crown rib portion 11, therefore, the crown rib portion 11 appears to be circumferentially divided into blocks 11B in a row. But, as the crown lateral grooves 15 are very shallow as explained above, the crown blocks 11B are, in substance, not separated from each other by the crown lateral grooves 15, and as a result, the crown rib portion 11 retains continuity in the tire circumferential direction.

The shoulder lateral grooves 18 extends from the axial inner edge 14i of the shoulder rib portion 14 towards the axial outer edge or the tread edge Te and terminate without reaching to the tread edge Te. Accordingly, the shoulder rib portion 14 is continuous in the tire circumferential direction in appearance. Further, due to the shallow shoulder lateral grooves 18, even in the part provided with the shoulder lateral grooves 18, the shoulder rib portion 18 retains continuity in the tire circumferential direction. Thus, the shoulder rib portion 14 is considered as an almost continuous rib in substance.

In order to adjust or decrease the rigidity of the crown rib portions 11, the use of sipes S is preferable to changing the depths of the lateral grooves 15. Incidentally, the sipe S is a cut or fine groove having a width of not more than 1.5 mm.

Preferably, the sipes S are provided within the crown lateral grooves 15 such that one sipe S is formed in the bottom 15U of each groove 15 and extends along the widthwise center line of the groove 15.

The above-mentioned circumferential grooves 8 are substantially straight grooves.

It is preferable that the circumferential grooves 8 are arranged symmetrically about the tire equator c.

For example, the widthwise center line 10G of each of the shoulder circumferential grooves 8s is positioned at an axial distance L2 of from 19 to 23% of the tread width TW axially inward from the tread edge Te.

Aside from the crown circumferential groove 8d disposed on the tire equator, the widthwise center line 9G of each of the crown circumferential grooves 8c is positioned at an axial distance L1 of from 8 to 12% of the tread width TW from the tire equator C.

The shoulder rib portions 14 have an axial width Ws, and the crown rib portions 11 have axial widths Wc (Wc1, Wc2).

The axial width Ws is set in a range of not less than 1.3 times, preferably not less than 1.35 times, but not more than 1.6 times, preferably not more than 1.5 times a value Wcmin which is one of the values of the axial widths we which is not larger than any of the others.

The ratio Wc2/Wc1 of the axial width Wc2 of the axially outer crown rib portions 11o to the axial width Wc1 of the axially inner crown rib portion(s) 11i is set in a range of from 0.95 to 1.05 in order to even the ground pressure distribution between the crown rib portions.

In the embodiment shown in the drawings, the axial width Wc1 of the crown rib portion 11 disposed on the tire equator is smaller than the axial width Wc2 of the crown rib portion 11 on each side thereof.

Thereby, among the rib portions 11 and 14, the rigidity distribution is improved, which helps to improve the wear resistance, straight running stability and cornering performance.

The circumferential grooves 8 each have a depth D1 in a range of from 15 to 20 mm.
Further, the circumferential grooves 8 each have a width W1 in a range of not less than 10 mm, preferably not less than 12 mm, but not more than 18 mm, preferably not more than 16 mm in order to improve the drainage and the rigidity of the rib portions 11 and 14 in a well balanced manner.

The depths D2 of the crown lateral grooves 15 are set in a range of not less than 9%, preferably not less than 10%, but not more than 30%, preferably not more than 25%, more preferably not more than 20% of the depth D1 of the adjacent circumferential groove 8.

The widths W2 of the crown lateral grooves 15 are set in a range of not less than 2.5 mm, preferably not less than 3.0 mm, but not more than 6.0 mm, preferably not more than 5.5 mm in order to achieve the drainage and the rigidity of the crown rib portion 11 in a well balanced manner.
It is preferable that the width W2 is constant along the entire length of the crown lateral groove 15.

The depths D3 of the shoulder lateral grooves 18 are set in a range of not less than 9%, preferably not less than 10%, but not more than 25%, preferably not more than 22%, more preferably not more than 20% of the depth D1 of the adjacent circumferential groove 8.

The widths W3 of the shoulder lateral grooves 18 are set in a range of not less than 2.5 mm, preferably not less than 3.0 mm, but not more than 6.0 mm, preferably not more than 5.5 mm. It is preferable that the width W3 is equal to W2 and constant along the entire length of the shoulder lateral groove 18.

Figure 4:
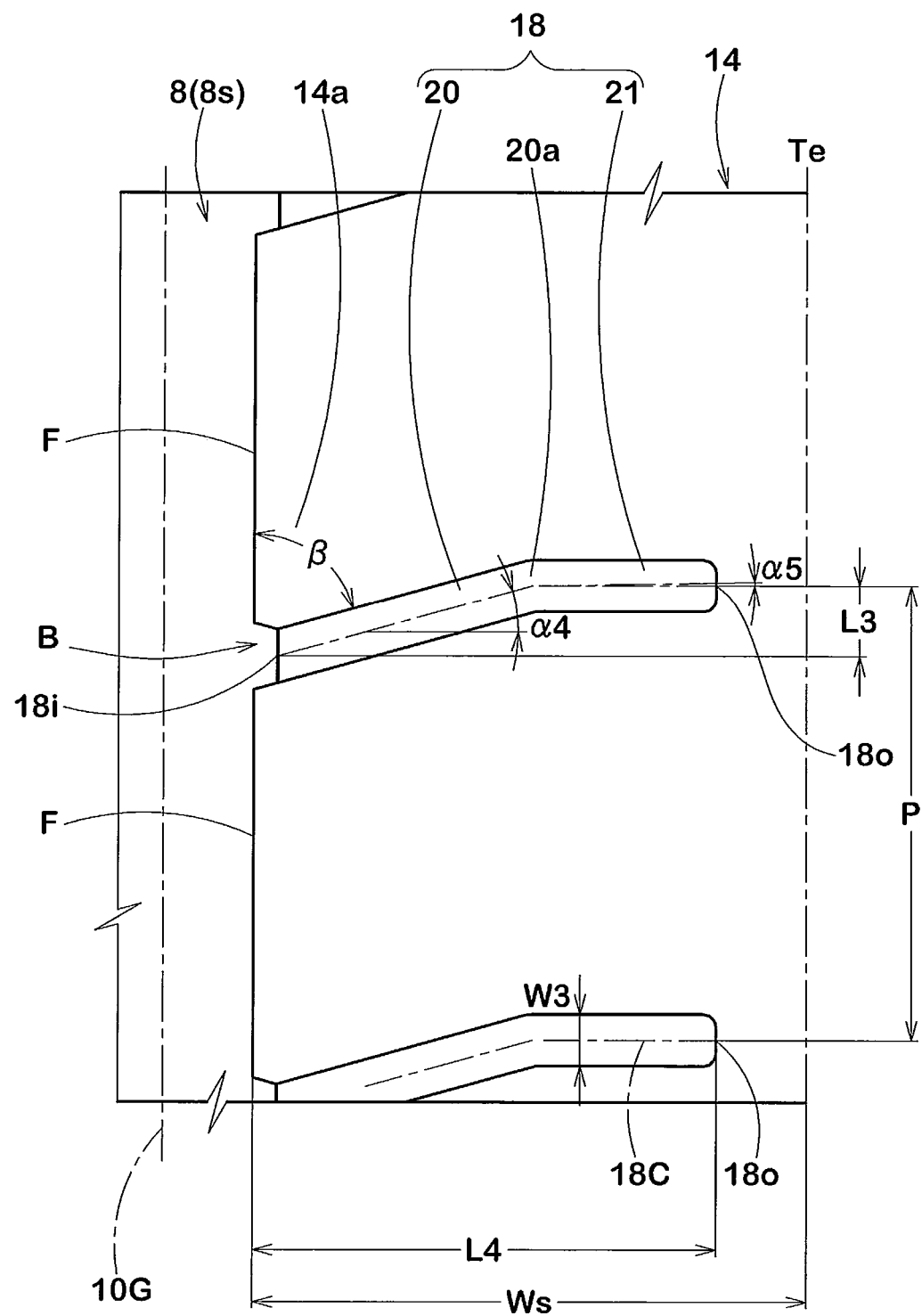
FIG. 4 is a partial plan view of the tread portion showing the shoulder rib portion.
Figure 5:
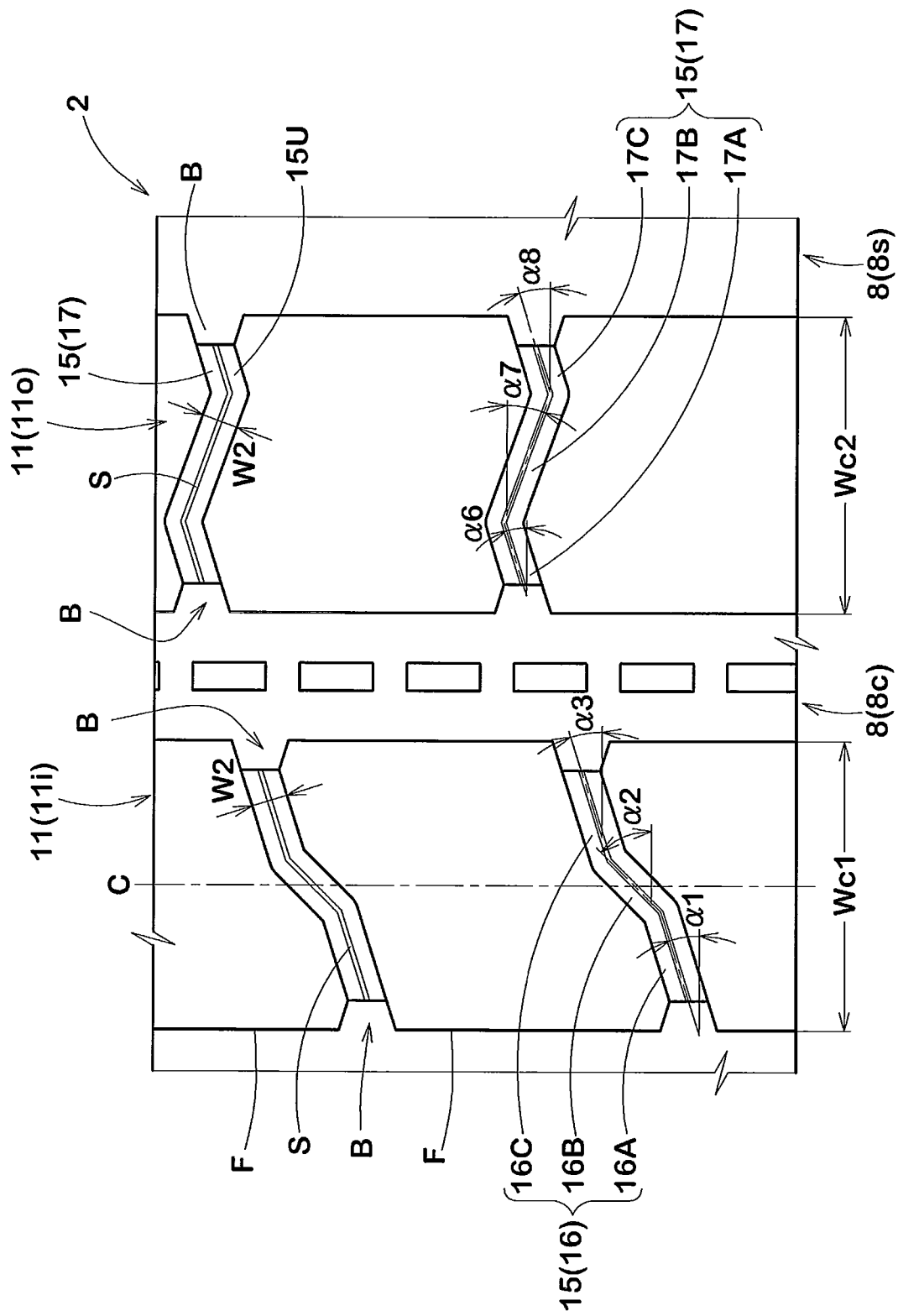
FIG. 5 is a partial plan view of the tread portion showing the crown rib portions.
Figure 6:
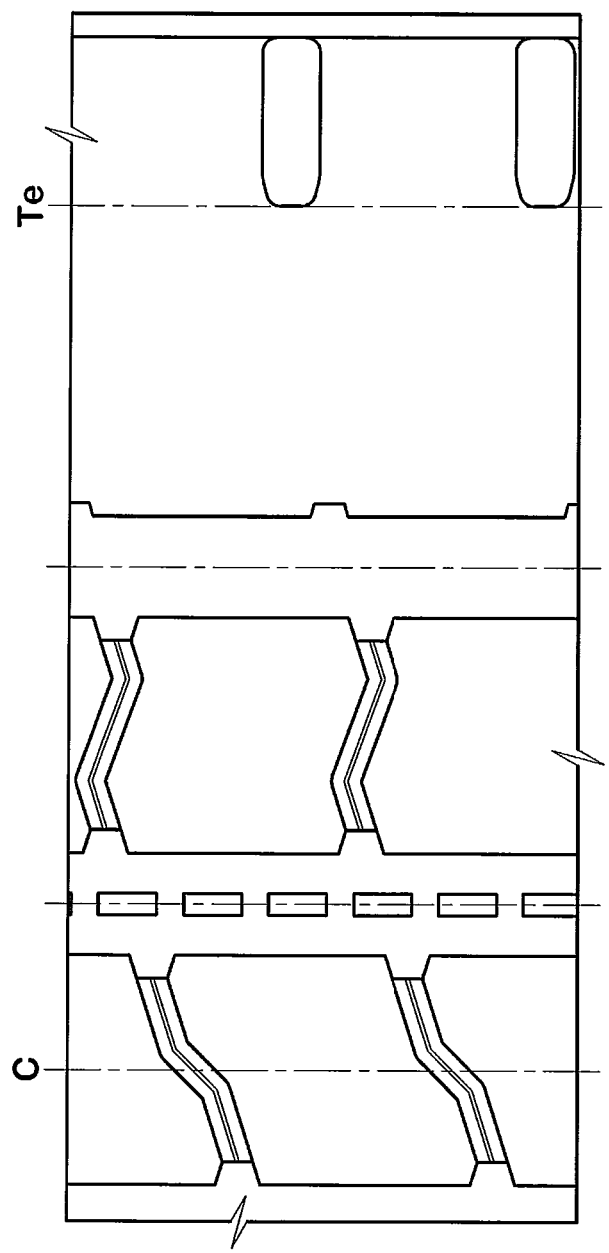
FIG. 6 is a developed partial plan view of a heavy duty tire used in the undermentioned comparative tests as a comparative example Ref.1.

The axial extent L4 of the shoulder lateral groove 18, which is, as shown in FIG. 4, measured on the widthwise center line of the groove from the axial inner end 18i to the axial outer end 18o thereof, is set in a range of not less than 78%, preferably not less than 80%, but not more than 88%, preferably not more than 86% of the axial width Ws of the shoulder rib portion 14.

Therefore, owing to the above described arrangement and structures of the grooves 8, 15 and 18, the rigidity in the crown rib portions 11 becomes decreased in comparison with the rigidity in the shoulder rib portions 14.
As a result of such rigidity distribution in the tread portion 2, the frictional energy applied to the tread portion 2 becomes even between the shoulder rib portion 14 and crown rib portion 11, and therefore, it is possible to control the occurrence of shoulder wear, namely, partial wear such that the shoulder rib portions 14 wear rapidly than other portions.

If the depth D1 of the circumferential grooves 8 is more than 20 mm, the rib portions 11 and 14 are decreased in the lateral stiffness (rigidity), and the wear resistance and steering stability are liable to deteriorate. If the depth D1 is less than 15 mm, as the groove volume decreases, it is difficult to provide necessary drainage.

If the number of the circumferential grooves 8 is less than 4, it is difficult to provide sufficient wet performance for the tire. If the number of the circumferential grooves 8 is more than 5, as the rib portions are decreased in the rigidity, it is difficult to improve the wear resistance of the tread portion, in particular, the shoulder wear resistance.

If the groove depth D2 of the crown lateral grooves 15 is more than 30% of the groove depth D1 of the circumferential groove 8, then the rigidity in the crown rib portions 11 is decreased and the wear resistance is decreased. If the groove depth D2 is less than 9% of the groove depth D1, then it is difficult to improve the wet performance.

If the axial width Ws of the shoulder rib portion 14 is less than 1.3 times the value Wcmin, then it becomes difficult to prevent friction of the shoulder rib portions 14 with the ground, therefore, the shoulder wear tends to occur. If the axial width Ws is more than 1.6 times the value Wcmin, in the central zone of the tread, the tread rubber becomes liable to be chipped off at the edges of the crown lateral grooves 15.

If the groove depth D3 of the shoulder lateral grooves 18 is more than 25% of the groove depth D1 of the circumferential groove 8, then the rigidity in shoulder rib portions 14 is decreased and the wear resistance is decreased. If the groove depth D3 is less than 9% of the groove depth D1, then it is difficult to improve the wet performance.

If the axial extent L4 of the shoulder lateral grooves 18 is more than 88% of the axial width Ws of the shoulder rib portion 14, then the rigidity of the shoulder rib portions 14 is greatly decreased and it is difficult to control the shoulder wear. If the axial extent L4 is less than 78% of the axial width Ws, then uneven wear is liable to occur along the shoulder circumferential grooves 8s. Further, it becomes difficult to improve the wet performance.

In each of the shoulder rib portions 14, as shown in FIG. 4, the shoulder lateral grooves 18 are bent at a substantially intermediate position 20a of the axial width Ws of the shoulder rib portion 14, and the shoulder lateral grooves 18 are formed in the same configuration.
Therefore, the shoulder lateral groove 18 is made up of
an axially inside part 20 extending from the axially inner edge 14i of the shoulder rib portion 14 toward the tread edge Te at an angle α4, and
an axially outside part 21 extending from the axially inside part 20 toward the tread edge Te at an angle α5, wherein the angle α4 is not less than 10 degrees, preferably not less than 12 degrees, but not more than 35 degrees, preferably not more than 33 degrees with respect to the tire axial direction, and the angle α5 is in a range of from −10 to 10 degrees (from 0 to 10 degrees if the inclining direction is left out of consideration), preferably not more than 9 degrees with respect to the tire axial direction.
Since the edges of the shoulder lateral grooves 18 are inclined with respect to the tire axial direction, the road grip performance during cornering and the steering stability can be improved.
If the angle α4 of the axially inside part 20 is more than 35 degrees, then the angle β of a corner 14a between the axially inside part 20 and the shoulder circumferential groove 8s becomes very narrow and the corner 14a is liable to be torn off. If the angle α4 is less that 10 degrees, then the steering stability during cornering can not be improved The circumferential distance L3 between the axial inner end 18i and the axial outer end 18o of the shoulder lateral groove 18 measured on the widthwise center line 18C thereof is preferably set in a range of not less than 10%, more preferably not less than 15%, but not more than 30%, more preferably not more than 25% of the circumferential pitch P between the circumferentially adjacent shoulder lateral grooves 18.
If the circumferential distance L3 is more than 30% of the circumferential pitch P, then the rigidity in the shoulder rib portion 14 can not be effectively decreased, and the shoulder wear is liable to occur. If the circumferential distance L3 is less than 10% of the circumferential pitch P, then the road grip performance during cornering and the steering stability can not be improved.

As shown in FIG. 2, on each side of the tire equator, the axial distance A of the axial outer end 18o of the shoulder lateral groove 18 from the tire equator C is preferably set in a range of not less than 95%, more preferably not less than 97%, but not more than 105%, more preferably not more than 103% of the axial distance BW of the axial outer edge 7e of the belt 7 from the tire equator c.
By employing this arrangement, the entire width of the grooved part of the tread portion provided with the shoulder lateral grooves and crown lateral grooves is reinforced, therefore, uneven wear due to the lateral grooves (rigidity decrease) can be prevented.

The axial distance BW is set in a range of not less than 0.85 times, preferably not less than 0.86 times, but not more than 0.95 times, preferably not more than 0.94 times one half (TW/2) of the tread width TW.
If the axial distance BW is less than 0.85 times TW/2, it can not reinforce the entire width of the tread portion, therefore, uneven wear becomes liable to occur. If the axial distance BW is more than 0.95 times TW/2, the durability of the buttress is liable to decrease. Further, the tire weight is unfavorably increased.

The depth of the above-mentioned sipe S is set to be less than the depth D1 of the adjacent circumferential groove 8, preferably less than 80% of the depth D1.
The sipe S extends across the entire width of the rib portion, and both ends are opened.
In order to optimize the rigidity distribution in a rib portion in which the sipes S are provided, the sipes S are decreased in the depth in their both end portions so such that the ratio Ds1/Ds2 of the depth Ds1 in the open end portions so to the depth Ds2 in the central portion Si becomes within a range of from 0.5 to 0.8.

By comparison with the tire section width SW, the tread width TW is set to be slightly wider than usual. Specifically, the ratio TW/SW of the tread width TW to the tire section width SW is set in a range of from 0.78 to 0.87. As a result, the lateral stiffness of the tire is increased to improve the steering stability. Further, the friction of the shoulder rib portions with the ground is lessened, and the shoulder wear can be improved.
If the ratio TW/SW is less than 0.78, the ground contacting area becomes narrow, and the wear resistance of the tread portion 2 tends to decrease. If the ratio TW/SW is more than 0.87, the sidewall portions, especially in a region from the maximum tire section width position to the tread edges, becomes relatively flat, and as a result, the ride comfort tends to deteriorate.

As explained above, the crown lateral grooves 15 and shoulder lateral grooves 18 are very shallow, therefore, in order to effectively lead the water in the circumferential grooves 8 to the lateral grooves 15 and 18, the lateral grooves 15 and 18 are extended radially inwardly from their axial ends to the bottoms of the circumferential grooves 8 along the side walls of the circumferential grooves 8 so that each of the side walls has radially-extending grooved parts (B) alternating with substantially flat surfaces (F) of the side wall.

The radially-extending grooved part (B) in this example is gradually increased in the width (measurement in the tire circumferential direction) from its bottom (deepest part occurring in the tire axial direction) to its opening (at the side wall). Thus, this part (B) has a substantially trapezoidal cross sectional shape. The depth of the radially-extending grooved part (B) is limited in the same range as the lateral groove.

In this embodiment, two types of zigzag grooves, oblique-type zigzag groove 16 and parallel-type zigzag groove 17 are used as the lateral grooves 15.
The oblique-type zigzag groove 16 extends zigzag along a oblique line inclining with respect to the tire axial direction towards one circumferential direction.
The parallel-type zigzag groove 17 extends zigzag along a straight line substantially parallel to the tire axial direction.
More specifically, the oblique-type zigzag groove 16 is made up of three linear parts which are a first oblique part 16A, a second oblique part 16B and a third oblique part 16c which are inclined with respect to the tire axial direction towards one circumferential direction (in the drawing, right-side up inclination).
The first oblique part 16A extends from one axial edge toward the other axial edge of the crown rib portion 11, while inclining at an angle $\alpha 1$ with respect to the tire axial direction.
The second oblique part 16B extends from the first oblique part 16A toward the other axial edge of the crown rib portion 11, while inclining with respect to the tire axial direction, at an angle $\alpha 2$ more than the angle $\alpha 1$.
The third oblique part 16c extends from the second oblique part 16B to the other axial edge of the crown rib portion 11, while inclining with respect to the tire axial direction, at an angle $\alpha 3$ less than the angle $\alpha 2$.
The angle $\alpha 1$ is set in a range of from 15 to 25 degrees.
The angle $\alpha 2$ is set in a range of from 40 to 50 degrees.
The angle $\alpha 3$ is set in a range of from 15 to 25 degrees.
Preferably, the angle $\alpha 1$ is equal to the angle ca.

The parallel-type zigzag groove 17 is made up of three linear parts which are a first oblique part 17A, a second oblique part 17B and a third oblique part 17C.
The first oblique part 17A extends from one axial edge toward the other axial edge of the crown rib portion 11, while inclining to one circumferential direction at an angle $\alpha 6$ with respect to the tire axial direction.
The second oblique part 17B extends from the first oblique part 17A towards the other axial edge of the crown rib portion 11, while inclining to the other circumferential direction opposite to the first oblique part 17A at an angle $\alpha 7$ with respect to the tire axial direction.
The third oblique part 17C extends from the second oblique part 17B to the other axial edge of the crown rib portion 11, while inclining to one circumferential direction opposite to the second oblique part 17B at an angle $\alpha 8$ with respect to the tire axial direction.
The angle $\alpha 6$ is set in a range of from 15 to 25 degrees.
The angle $\alpha 7$ is set in a range of from −15 to −25 degrees.
The angle $\alpha 8$ is set in a range of from 15 to 20 degrees.
In this example, the angles $\alpha 6$, $\alpha 7$ and $\alpha 8$ are of the same values.

In the case that the tread portion is provided with the four circumferential grooves 8 as shown in the drawings, it is preferable that the crown lateral grooves 15 provided in the axially outer crown rib portions 11o are the parallel-type zigzag groove 17, and the crown lateral grooves 15 provided in the axially inner crown rib portion 11i disposed on the tire equator C are the oblique-type zigzag groove 16.

In the case that the tread portion is provided with the five circumferential grooves 8, the crown lateral grooves 15 provided in the axially outer crown rib portions 11o are the parallel-type zigzag groove 17, and
the crown lateral grooves 15 provided in the axially inner crown rib portions 11i disposed one on each side of the tire equator C may be the oblique-type zigzag groove 16 or alternatively the parallel-type zigzag groove 17.

In any case, it is preferable that the lateral grooves (15, 18) in each rib portion (11, 14) are substantially parallel with each other.

Further, in order to facilitate drainage from the tread center zone towards the tread edges, it is preferred that an imaginary extension of each lateral groove (15, 18) coincides with an imaginary extension of one of the axially-adjacent lateral grooves (15, 18).

Figure 3:
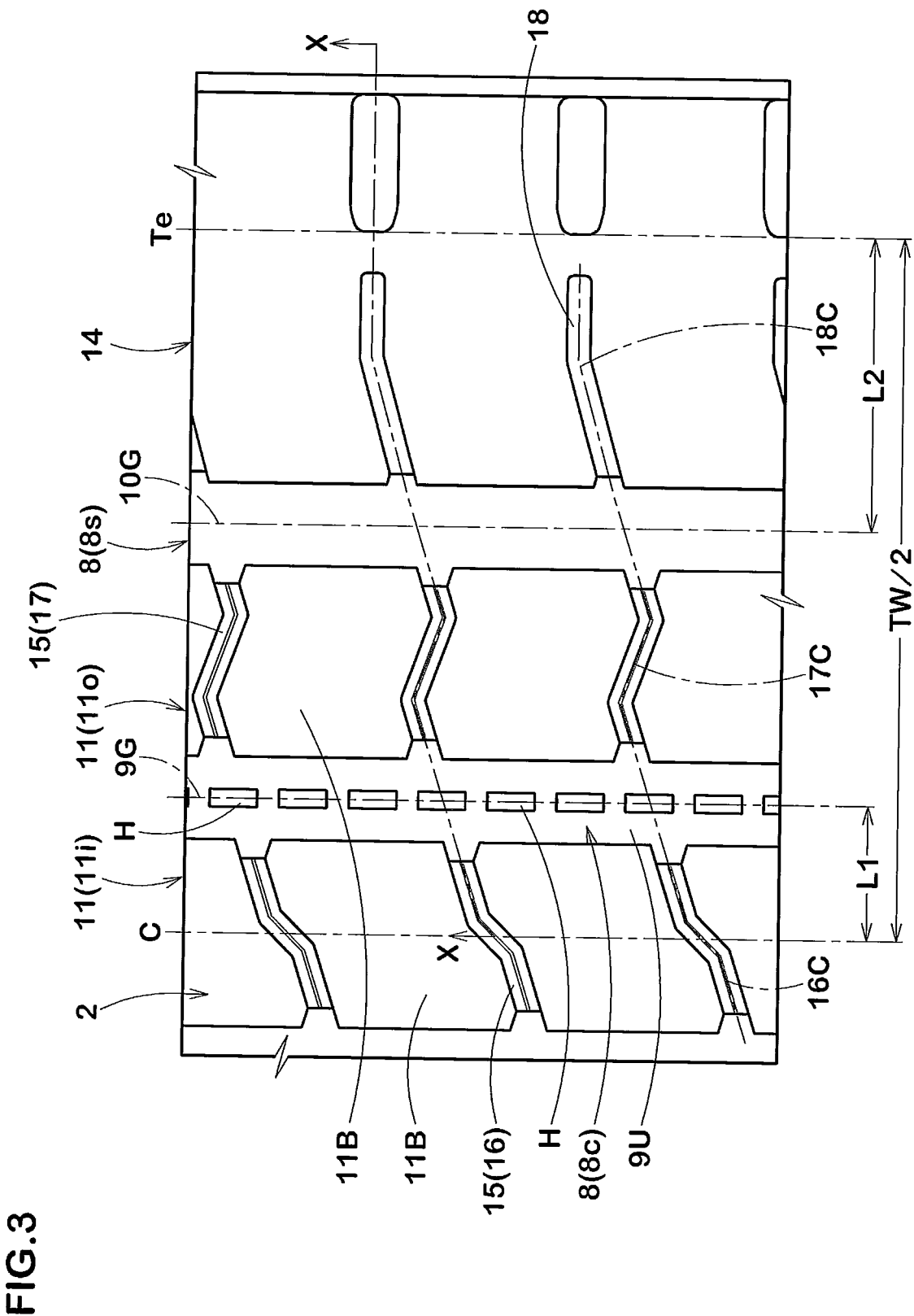
FIG. 3 is a developed partial plan view of the heavy duty tire showing the tread portion thereof.

More specifically, in the case of the example shown in FIG. 3, an axially inward extension of the widthwise center line 17C of each of the parallel-type zigzag grooves 17 (lateral groove 15) coincides with an axially outward extension of the widthwise center line 16C of one of the oblique-type zigzag grooves 16 (lateral groove 15), and an axially outward extension of the widthwise center line 17C of the above-mentioned parallel-type zigzag groove 17 (lateral groove 15) coincides with an axially inward extension of the widthwise center line 18c of one of the shoulder lateral grooves 18.

By the zigzag configurations of the zigzag grooves 16 and 17, the total length of the groove edges increases, and the road grip performance can be improved.

Since the oblique-type zigzag grooves 16 are inclined to one direction, as the tire rotates, water existing between the tread surface and the road surface is led toward the direction of the grooves 16, and the drainage performance is improved. If the angles α1, α2 and α3 are outside the above-mentioned ranges, it becomes difficult to improve the drainage performance.

Since the angle α1 is equal to the angle α3 and the angle α6 is equal to the angle α8, the rigidity of the crown rib portion is evened between both edge portions in the tire axial direction, and the occurrence of uneven wear is effectively controlled.

The zigzag grooves 16 and 17 are provided with the sipes S along their widthwise center lines, namely zigzag center lines, as explained above, therefore, the opposite walls of the parts of the rib portions which parts are divided by the sipes, can engage with each other when subjected with a sharing force.

As a result, the rib portion function as a continuous rib against the lateral forces applied, and a deterioration of the steering stability can be prevented.

In order that small objects such as stones on the roads are not entrapped within the circumferential grooves 8, it is preferred that at least the crown circumferential grooves 8c are provided in the groove bottom 9U with a plurality of independent humps H. The humps H are arranged at intervals along the widthwise center line of the groove, and in this example, the hump H has a substantially rectangular configuration as shown in FIGS. 1 and 2.

Comparison Tests

According to the internal structure shown in FIG. 1 and the tread pattern shown in FIG. 3, heavy duty tires of size 295/80R22.5 (rim size: 22.5×9.00) for truck and bus were prepared, and tested for the shoulder wear resistance and wet performance.

All of the tires had same structures except for the specifications shown in Table 1.

Wet Performance Test:

A test car (2DD wheel type truck) provided on the front wheels with test tires (tire pressure 850 kPa) was run along a 60 meter radius circle on a wet asphalt road covered with 1-2 mm depth water, and the fastest time to run five laps was measured. The vertical tire load was 50% of the tire load specified by ETRTO. Reciprocal number of the measured time in second is indicated in Table 1 by an index based on comparative example Ref.1 being 100, wherein the larger value is better.

Shoulder wear resistance test: After the above-mentioned test car was run for 20000 km, the difference in the tire radius between the shoulder rib portions 14 and axially outer crown rib portions 11o was measured as the amount of shoulder wear. The results are indicated in Table 1, wherein the smaller the value, the higher the shoulder wear resistance.

From the test results, it was confirmed that both of the shoulder wear resistance and wet performance can be improve.

TABLE 1

| | Tire | | | | | | | | | |
|---|---|---|---|---|---|---|---|---|---|---|
| | Ref. 1 | Ref. 2 | Ref. 3 | Ref. 4 | Ref. 5 | Ref. 6 | Ref. 7 | Ref. 8 | Ref. 9 | Ref. 10 |
| Tread pattern (Fig.) | 6 | 3 | 3 | 3 | 3 | 3 | 3 | 3 | 3 | 3 |
| D2/D1 (%) | — | 7 | 9 | 15 | 25 | 30 | 32 | 20 | 20 | 20 |
| D3/D1 (%) | — | 7 | 7 | 7 | 7 | 7 | 7 | 7 | 9 | 13 |
| L4/Ws (%) | — | 76 | 76 | 76 | 76 | 76 | 76 | 76 | 76 | 76 |
| A/BW (%) | — | 92 | 92 | 92 | 92 | 92 | 92 | 92 | 92 | 92 |
| L3/P (%) | — | 16 | 16 | 16 | 16 | 16 | 16 | 16 | 16 | 16 |
| BW/(TW/2) (%) | 100 | 100 | 100 | 100 | 100 | 100 | 100 | 100 | 100 | 100 |
| Shoulder wear (mm) | 0.5 | 0.7 | 0.7 | 0.8 | 0.8 | 1.1 | 1.2 | 0.8 | 0.7 | 0.9 |
| Wet performance | 100 | 102 | 104 | 106 | 108 | 110 | 107 | 105 | 105 | 106 |

| | Tire | | | | | | | | | |
|---|---|---|---|---|---|---|---|---|---|---|
| | Ref. 11 | Ref. 12 | Ref. 13 | Ex. 1 | Ex. 2 | Ex. 3 | Ref. 14 | Ex. 4 | Ex. 5 | Ex. 6 |
| Tread pattern (Fig.) | 3 | 3 | 3 | 3 | 3 | 3 | 3 | 3 | 3 | 3 |
| D2/D1 (%) | 20 | 20 | 20 | 20 | 20 | 20 | 20 | 20 | 20 | 20 |
| D3/D1 (%) | 25 | 27 | 17 | 17 | 17 | 17 | 17 | 17 | 17 | 17 |
| L4/Ws (%) | 76 | 76 | 76 | 78 | 83 | 88 | 90 | 83 | 88 | 83 |
| A/BW (%) | 92 | 92 | 92 | 93 | 94 | 96 | 98 | 100 | 105 | 100 |

TABLE 1-continued

| | | | | | | | | | | |
|---|---|---|---|---|---|---|---|---|---|---|
| L3/P (%) | 16 | 16 | 16 | 16 | 16 | 16 | 16 | 16 | 16 | 30 |
| BW/(TW/2) (%) | 100 | 100 | 100 | 100 | 100 | 100 | 100 | 94 | 91 | 94 |
| Shoulder wear (mm) | 1.1 | 1.2 | 0.9 | 0.7 | 0.7 | 0.8 | 1.3 | 0.6 | 0.9 | 0.7 |
| Wet performance | 110 | 110 | 107 | 109 | 109 | 110 | 110 | 109 | 110 | 110 |

Common specifications:
Tread width TW: 239 mm = 80% of Tire section width SW
Circumferential grooves
width W1: 14.0 mm
depth D1: 16.5 mm
Crown circumferential grooves
axial distance L1 from tire equator: 9% of Tread width TW
Shoulder circumferential grooves
axial distance L2 from tread edge: 20% of Tread width TW
Shoulder lateral grooves
width W3: 4.0 mm
angle α4: 16 degrees
angle α5: 0 degrees
circumferential pitches P: 36 mm
Crown lateral grooves
width W2: 4.0 mm
depth D2: 12% of Depth D1
Oblique-type zigzag grooves 16
angle α1: 19 degrees
angle α2: 44 degrees
angle α3: 19 degrees
Parallel-type zigzag grooves 17
angle α6: 19 degrees
angle α7: 20 degrees
angle α8: 19 degrees

REFERENCE SIGNS LIST

2 Tread portion
3 Sidewall portion
4 Bead portion
5 Bead core
6 carcass
7 Belt
8 (8s, 8c) circumferential groove (shoulder, crown)
11 (11i, 11o) Crown rib portion (inner, outer)
14 Shoulder rib portion
15 Crown lateral groove
16 oblique-type zigzag groove
17 Parallel-type zigzag groove
18 shoulder lateral groove
SW Tire section width
Te Tread edge
TW Tread width

The invention claimed is:
1. A heavy duty tire comprising
a tread portion having tread edges defining a tread width TW,
a pair of sidewall portions defining a cross sectional width SW of the tire,
a pair of bead portions each with a bead core therein,
a carcass extending between the bead portions through the tread portion and the sidewall portions, and
a belt composed of a plurality of belt plies disposed radially outside the carcass in the tread portion, wherein
the tread width TW between the tread edge is in a range of 0.78 to 0.87 times the cross sectional width SW of the tire,
the tread portion is provided with four or five circumferential grooves each of which has a depth of from 15 to 20 mm and extends continuously in the tire circumferential direction so as to axially divide the tread portion into five or six rib portions, the five or six rib portions are a pair of shoulder rib portions extending along the tread edges and provided with shoulder lateral grooves, and three or four crown rib portions disposed between the shoulder rib portions and each provided with crown lateral grooves,
said crown lateral grooves are arranged at intervals in the tire circumferential direction, and extend across the entire width of the crown rib portion, and the depth of the crown lateral grooves is in a range of from 9 to 30% of the depth of the circumferential grooves,
said shoulder lateral grooves are arranged at intervals in the tire circumferential direction, and extend axially outwardly from an axially inner edge of the shoulder rib portion so as to terminate at an axial distance of from 78 to 88% of the axial width of the shoulder rib portion from said axially inner edge, and the depth of the shoulder lateral grooves is in a range of from 9 to 25% of the depth of the circumferential grooves,
when measured at the groove center line, a circumferential distance between the axial inner end and the axial outer end of the shoulder lateral groove is in a range of from 10 to 30% of a circumferential pitch length between the circumferentially adjacent shoulder lateral grooves, and
each of the crown lateral grooves is provided in the groove bottom with a sipe extending along the length of the crown lateral groove, but no sipe is formed in the bottoms of the shoulder lateral grooves.
2. The heavy duty tire according to claim 1, wherein
an axial distance (A) measured from the tire equator C to the axial outer end of the shoulder lateral grooves is in a range of from 95 to 105% of an axial distance BW measured from the tire equator C to the axial outer edge of the belt.
3. The heavy duty tire according to claim 1 or 2, wherein
the shoulder lateral groove is bent and composed of an axially inside part extending from the axially inner edge of the shoulder rib portion towards the tread edge at an angle of from more than 10 degrees to 35 degrees with respect to the tire axial direction, and an axially outside part extending from the axially inside part towards the tread edge at an angle of from −10 degrees to 10 degrees with respect to the tire axial direction.

4. The heavy duty tire according to claim 1, wherein the axial width of the shoulder rib portions is in a range of from 1.3 to 1.6 times the axial width of one of the crown rib portions which is not wider than any of the other crown rib portions.

5. The heavy duty tire according to claim 1, wherein each of the crown lateral grooves is a zigzag groove made up of three linear parts.

6. The heavy duty tire according to claim 5, wherein the crown lateral grooves disposed in the crown rib portions located on both sides of the tire equator are configured so that each extends zigzag along a straight line substantially parallel to the tire axial direction.

7. The heavy duty tire according to claim 6, wherein the crown lateral grooves disposed in the crown rib portion located on the tire equator are configured so that each extends zigzag along an oblique line inclining with respect to the tire axial direction towards one circumferential direction.

\* \* \* \* \*